A. NOVICK AND E. FISH.
GAGE.
APPLICATION FILED FEB. 2, 1921.

1,394,336.

Patented Oct. 18, 1921.

Inventors:
Abraham Novick
and Edward Fish
By Wilbur M. Stone
their Attorney.

UNITED STATES PATENT OFFICE.

ABRAHAM NOVICK, OF BROOKLYN, AND EDWARD FISH, OF NEW YORK, N. Y., ASSIGNORS TO FERDINAND L. SMITHE, OF NEW YORK, N. Y.

GAGE.

1,394,336. Specification of Letters Patent. Patented Oct. 18, 1921.

Application filed February 2, 1921. Serial No. 441,722.

*To all whom it may concern:*

Be it known that we, ABRAHAM NOVICK and EDWARD FISH, citizens of the United States, and residing, respectively, at New York, borough of Brooklyn, in the county of Kings and State of New York, and at New York, borough of Manhattan, in the county of New York and State of New York, have invented certain new and useful Improvements in Gages, of which the following is a specification.

This invention relates to gages and particularly to that class thereof which is adapted for indicating, preferably on a scale, the height of a body of liquid in a tank remote from the scale and located at any height relatively to said scale.

The object of our improvements is to provide a gage of the class specified, simple in construction, accurate in operation, and which may be used with equal facility in a number of different environments.

Figure 1:
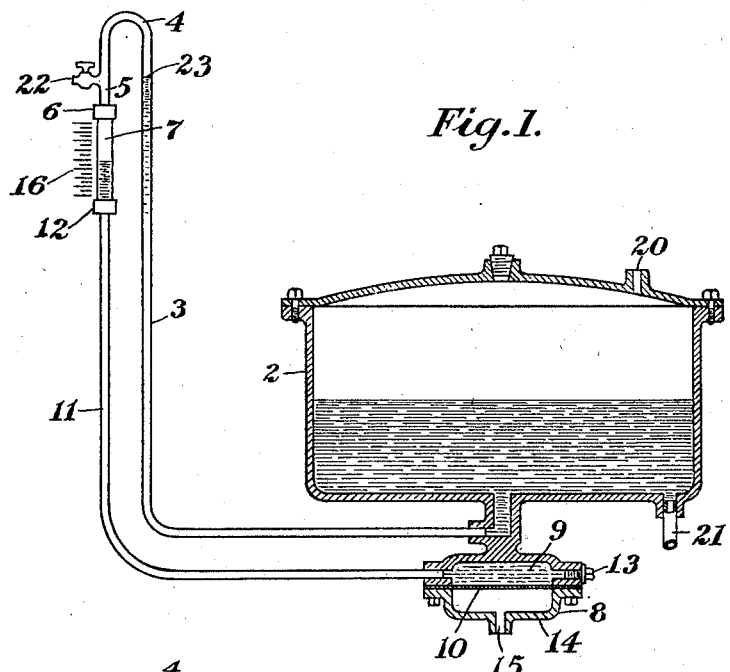
Figure 2:
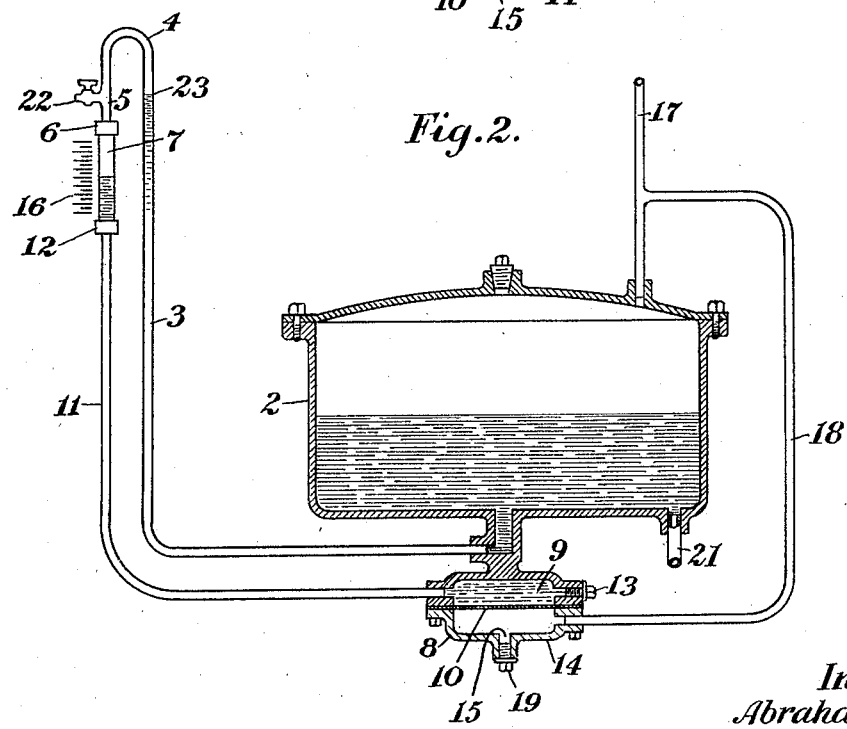

With these ends in view our improvements comprise features which are illustrated in their preferred embodiment in the drawings accompanying this specification, wherein Figure 1 is a side elevation, largely in section, of a tank and gage to which our improvements are applied. Fig. 2 is a view similar to that of Fig. 1 and illustrating a modification of our improvements.

Gages of this general class of which we have knowledge, while in many cases giving excellent service in stationary installations, have been unsatisfactory because of inaccuracy when applied to moving vehicles, such as automobiles. In such service the car on which they are mounted is subject to the unevennesses of the road and particularly in going up and down hills, when the gage is liable to such changes of relation to the tank as to cause the reading to be erroneous. In our improvements we have eliminated these difficulties and have provided a gage of accuracy and reliability.

Directing attention now to Fig. 1 of the drawings, 2 is a tank, such for instance as is adapted for holding the gasolene supply in an automobile. This tank may be provided with the usual supply pipe 21 leading to the engine, not shown. Leading from the bottom of tank 2, to some more or less distant point, herein shown as definitely above the level of said tank, is pipe 3 of relatively small diameter, the upper and preferably vertical portion of which terminates in return loop 4 and end 5 of said loop is connected, as by coupling 6, with the upper end of a short length of transparent tube 7. Just above coupling 6 in portion 5 of pipe 3 is vent cock 22. At some convenient location, as for instance below tank 2, is diaphragm box 8 having chamber 9 one wall of which is formed by flexible diaphragm 10. Leading from said chamber 9 is pipe 11 similar to pipe 3 and terminating at coupling 12 by which it is connected with the lower end of said transparent tube 7. Diaphragm box chamber 9 may be provided with a filling opening closed by plug 13. The lower face of diaphragm 10 is exposed to the atmosphere but may be protected from dirt by casing 14 in which is port 15 communicating with the atmosphere. Tube 7 may be provided with graduated scale 16 adjacent thereto, against which may be read the height of the liquid in said tube. In the modification of Fig. 2, pipe 17 leads from the usual air pressure pump, not shown, into tank 2 and branch 18 of said pipe leads into casing 14 below diaphragm 10. In this modification port 15 is closed by plug 19. By this means an equal pressure is maintained in the tank 2 and below diaphragm 10. In the arrangement of Fig. 1 equal atmospheric pressure is maintained by having the tank open to the atmosphere through vent 20 and the diaphragm open to the atmosphere through port 15.

The operation of our improved device is as follows: Tank 2 is provided with gasolene or other liquid to be gaged, say to about half its capacity. Then by means of an air pump applied to vent 20 the liquid is forced upwardly in pipe 3 to level 23, preferably just above the top of transparent tube 7 and held at that level. Then chamber 9 and pipe 11 are filled with an indicating liquid, such as colored alcohol, through the opening closed by plug 13 and the level of such liquid is forced upwardly to about midway the height of tube 7, vent cock 22 being opened to permit the escape of air during the filling of chamber 9 and tube 11. The vent cock is then closed and plug 13 replaced. The weight of the liquid in pipe 11 will cause diaphragm 10 to be deflected slightly downwardly. The apparatus is now ready for use. If now the contents of tank 2 be increased, the height of the liquid at 23 will be raised by the increased weight of liquid in the tank, the air between the top of the liquid at 23 and the top of the indicating liquid in tube 7 will force downwardly the level of the liquid in tube 7 and pipe 11, and discharge the surplus liquid into chamber 9, thereby deflecting diaphragm 10 downwardly. On the other hand if a portion of the liquid in tank 2 be withdrawn, the relief of pressure by the decreased weight of said liquid will cause the level 23 of the liquid in pipe 3 to fall, thereby permitting diaphragm 10 to force a portion of the liquid in chamber 9 upwardly into pipe 11, thereby raising the level of that liquid in tube 7. It will be understood that the deflection of diaphragm 10 due to variations in the amount of liquid in tank 2 is very slight and that the consequent variation in the height of the level of the indicating liquid in tube 7 is also slight, so that a wide range in the height of the liquid in tank 2 is indicated by a narrow range of height in the liquid in tube 7. By this arrangement a comparatively short transparent tube and indicating scale may be used. It will also be noted that as the indicating liquid in chamber 9, pipe 11 and tube 7 is sealed in place, it cannot be affected by any shifting of position of the device but only by changes in pressure on its top level in tube 7 due to changes in the amount of liquid in tank 2. The apparatus is therefore accurate and reliable under varying conditions.

We claim:

1. In a gage for liquids the combination of a tank for the liquid to be gaged, a diaphragm box including a chamber having a yieldable diaphragm forming one wall thereof, a pipe connecting the bottom portion of said tank with said diaphragm box chamber, a transparent portion in said pipe, said diaphragm box chamber and that portion of said connecting pipe extending from said chamber to said transparent portion being filled with an indicating liquid, that portion of said pipe extending from said tank to said transparent portion being filled to a point relatively near said transparent portion with liquid similar to that to be gaged, and an air space in said pipe between the levels of the two liquids.

2. In a gage for liquids the combination of a tank for the liquid to be gaged, a diaphragm box including a chamber having a yieldable diaphragm forming one wall thereof, a pipe connecting the bottom portion of said tank with said diaphragm box chamber and extending upwardly to a return loop and then downwardly to said diaphragm box chamber, a transparent portion in the downwardly extending portion of said pipe, said diaphragm box chamber and that portion of said connecting pipe extending from said chamber to said transparent portion being filled with an indicating liquid, that portion of said pipe extending from said tank to said return loop being filled with liquid similar to that to be gaged, and an air space in said pipe between the levels of the two liquids.

3. In a gage for liquids the combination of a tank for the liquid to be gaged, a diaphragm box including a chamber having a yieldable diaphragm forming one wall thereof, a pipe connecting the bottom portion of said tank with said diaphragm box chamber, a transparent portion in said pipe, said diaphragm box chamber and that portion of said connecting pipe extending from said chamber to said transparent portion being filled with an indicating liquid, that portion of said pipe extending from said tank to said transparent portion being filled to a point relatively near said transparent portion with liquid similar to that to be gaged, an air space in said pipe between the levels of the two liquids, and a scale adjacent said transparent portion in said pipe.

4. In a gage for liquids the combination of a tank for the liquid to be gaged, a diaphragm box including a chamber having a yieldable diaphragm forming one wall thereof, a pipe connecting the bottom portion of said tank with said diaphragm box chamber and extending to a return loop and then to said diaphragm box chamber, a transparent portion in that portion of said pipe between said loop and said diaphragm box chamber, that portion of said connecting pipe extending from said chamber to said transparent portion being filled with an indicating liquid and that portion of said pipe extending from said tank to said return loop being filled with liquid similar to that to be gaged, and an air space in said pipe between the levels of the two liquids.

5. In a gage for liquids the combination of a tank for the liquid to be gaged, a diaphragm box including a chamber having a yieldable diaphragm forming one wall thereof, a pipe connecting the bottom portion of said tank with said diaphragm box chamber, a transparent portion in said pipe, said diaphragm box chamber and that portion of said connecting pipe extending from said chamber to said transparent portion being filled with an indicating liquid, that portion of said pipe extending from said tank to said transparent portion being filled to a point relatively near said transparent portion with liquid similar to that to be gaged, an air space in said pipe between the levels of the two liquids, a casing inclosing the yieldable diaphragm on that side opposite said chamber, and a pipe leading from a source of air pressure to said tank and to said casing whereby equal pressure is maintained in said tank and casing.

6. In a gage for liquids the combination of a tank for the liquid to be gaged, a diaphragm box including a chamber having a yieldable diaphragm forming one wall thereof, a pipe connecting the bottom portion of said tank with said diaphragm box chamber, and extending upwardly to a return loop and then downwardly to said diaphragm box chamber, a transparent portion in the downwardly extending portion of said pipe, said diaphragm box chamber and that portion of said connecting pipe extending from said chamber to said transparent portion being filled with an indicating liquid, that portion of said pipe extending from said tank to said return loop being filled with liquid similar to that to be gaged, an air space in said pipe between the levels of the two liquids, a casing inclosing the yieldable diaphragm on that side opposite said chamber, and a pipe leading from a source of air pressure to said tank and to said casing whereby equal pressure is maintained in said tank and casing.

In witness whereof we hereby affix our signatures this 31st day of January, 1921.

ABRAHAM NOVICK.
EDWARD FISH.